United States Patent [19]
Belinky et al.

[11] Patent Number: 6,076,691
[45] Date of Patent: Jun. 20, 2000

[54] ADJUSTABLE ENCLOSURE AND MOUNTING BOX FOR A TRAILER HITCH ELECTRICAL CONNECTOR

[75] Inventors: Jacob S. Belinky, Carleton; David L. Rogers, Canton, both of Mich.

[73] Assignee: MascoTech Inc., Taylor, Mich.

[21] Appl. No.: 09/295,054

[22] Filed: Apr. 20, 1999

Related U.S. Application Data

[63] Continuation-in-part of application No. 08/692,589, Aug. 6, 1996, Pat. No. 5,904,261.
[60] Provisional application No. 60/090,095, Jun. 19, 1998.

[51] Int. Cl.[7] ..................................................... H02G 3/08
[52] U.S. Cl. ............................................................. 220/3.9
[58] Field of Search ................................ 220/3.2, 3.3, 3.9

[56] References Cited

U.S. PATENT DOCUMENTS

| | | |
|---|---|---|
| D. 254,846 | 4/1980 | Wood . |
| D. 273,778 | 5/1984 | Ruhland . |
| D. 332,942 | 2/1993 | Julien . |
| D. 345,145 | 3/1994 | Fogg et al. . |
| D. 358,270 | 5/1995 | Guppy . |
| 2,643,787 | 6/1953 | Rockman . |
| 2,878,301 | 3/1959 | Dierstein et al. . |
| 4,747,506 | 5/1988 | Stuchlik, III . |
| 4,781,393 | 11/1988 | Jeter . |
| 4,842,524 | 6/1989 | Hopkins et al. . |
| 5,288,094 | 2/1994 | Putnam . |
| 5,407,088 | 4/1995 | Jorgensen et al. . |
| 5,407,219 | 4/1995 | Chiu . |
| 5,433,389 | 7/1995 | Hughes . |
| 5,904,261 | 5/1999 | Belinky et al. ............... 220/3.9 |

OTHER PUBLICATIONS

Hoffman Engineering Corporation Publication—Dated 1962.

*Primary Examiner*—Steven M. Pollard
*Attorney, Agent, or Firm*—Reising, Ethington, Barnes, Kisselle, et al

[57] ABSTRACT

A mounting box 30 for mounting an electrical connector 40 laterally to a cross tube 32 of a trailer hitch 34. Walls 42, 44, 46, 48 and 50 enclose the body. An opening 52 of the box 30 is closed by two walls 39 and 37 of the cross tube. The electrical cable extends through a first end wall 44 through a cut out 69. The cable is connected to a connector 40 that is mounted through an opening 68 in the end wall 42. The sections 282 and 284 in proximity to the v-shaped notches 54 and 56 adjacent the open side 52 are trimmable to change the shape of the notches into semi-circular notches 154 and 156.

14 Claims, 7 Drawing Sheets

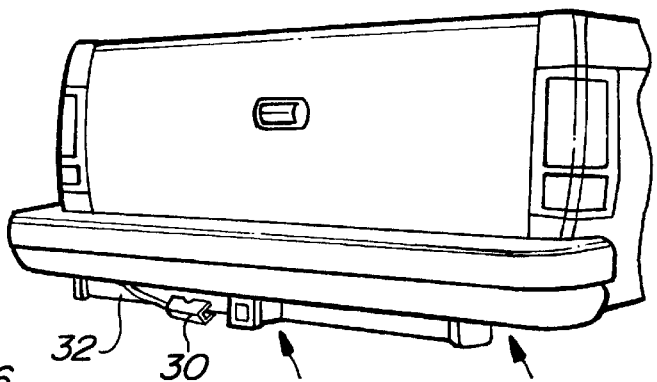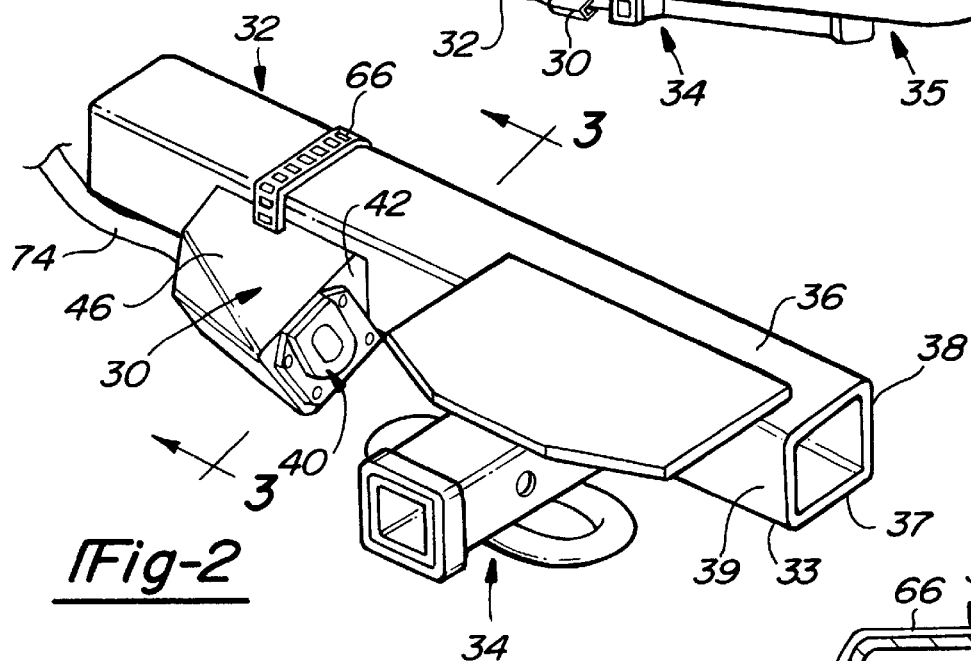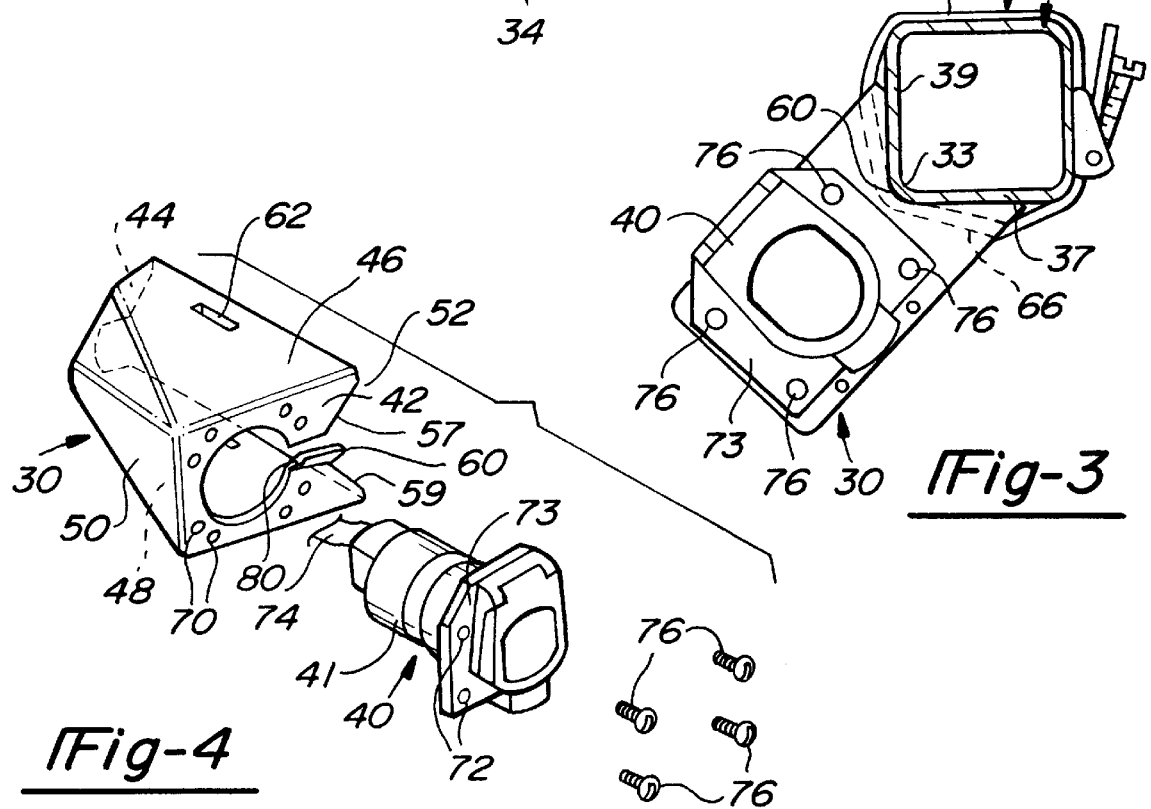

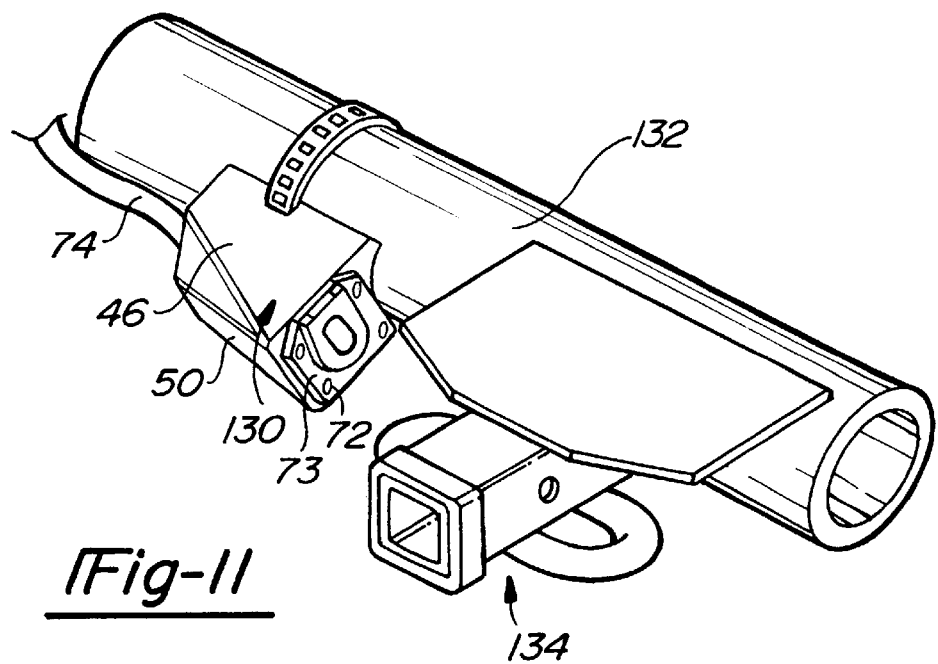
_Fig-11_
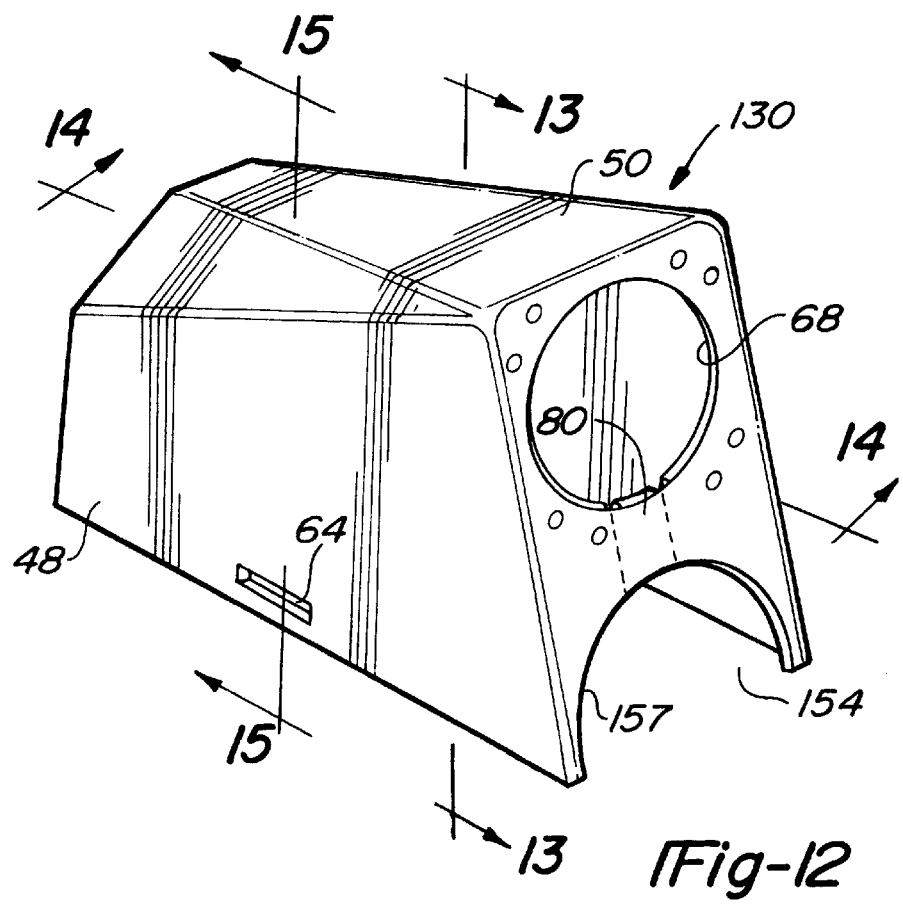
_Fig-12_

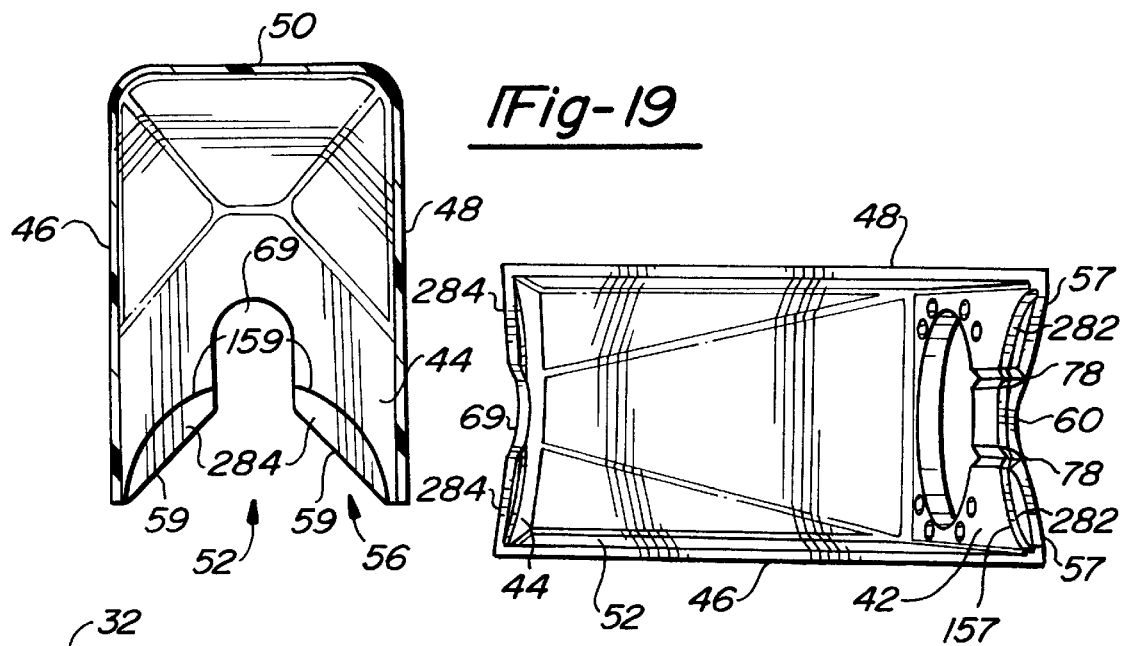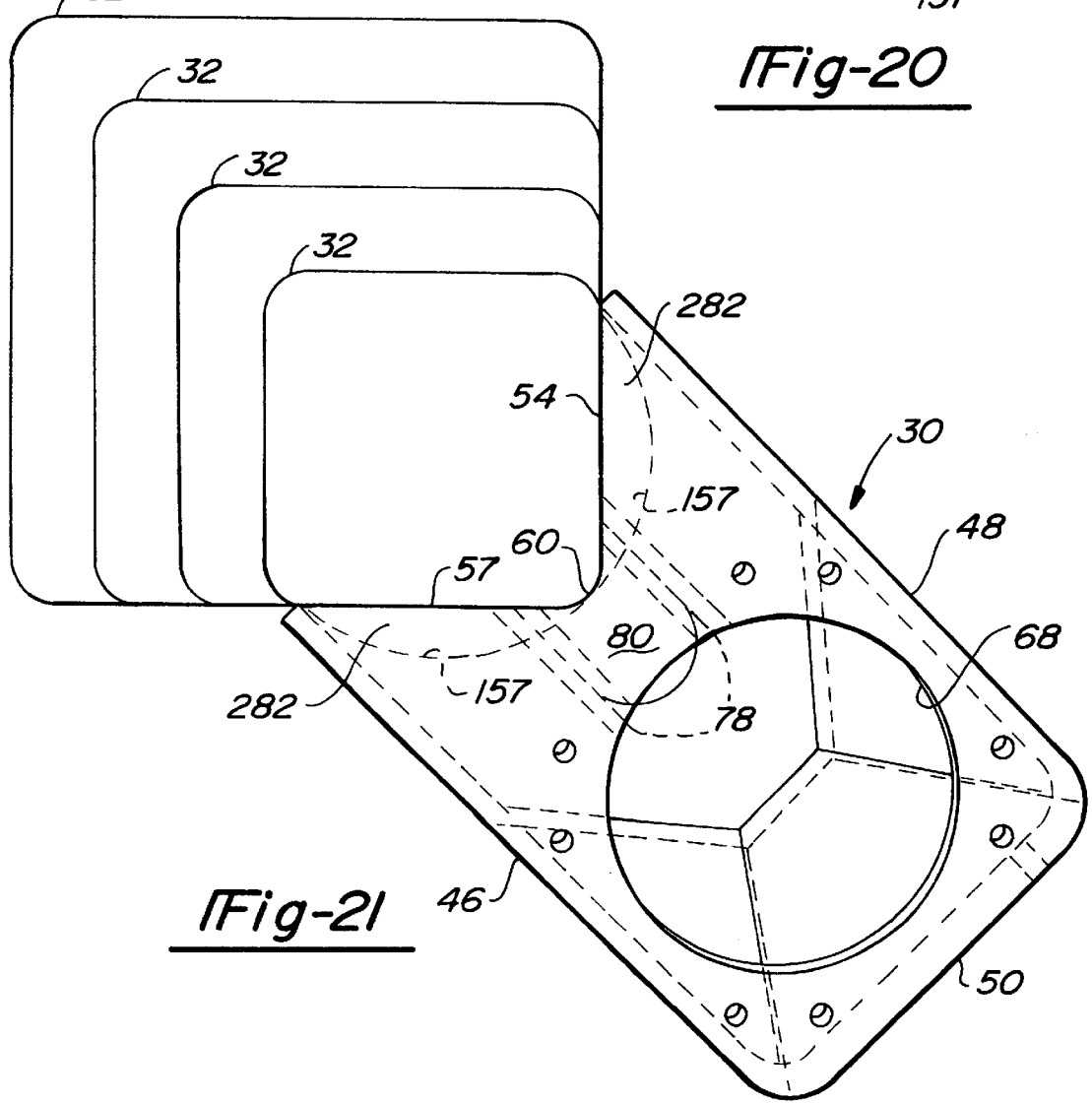

ADJUSTABLE ENCLOSURE AND MOUNTING BOX FOR A TRAILER HITCH ELECTRICAL CONNECTOR

This application is a continuation-in-part of U.S. Ser. No. 08/692,589 filed on Aug. 6, 1996 U.S. Pat. No. 5,904, 261 and also a claim of priority is made under 35 U.S.C. 119(e)(1) based on the United States Provisional Application 60/090,095 filed on Jun. 19, 1998.

TECHNICAL FIELD

This invention relates to trailer hitch electrical connector mounts and in particular to a mounting box for enclosing and mounting an electrical connector to a trailer hitch.

BACKGROUND OF THE COMMERCIALLY AVAILABLE HITCHES INVENTION

An electrical connector is commonly carried by a towing vehicle for communication of tail, brake, and turn signal lights from the towing vehicle to a trailer. Typically, the electrical connector loosely hangs from a cable or is mounted to either the towing vehicle or the trailer hitch by a bracket. In such a condition, the electrical connector is exposed to a rough ambient environment that can result in wear and damage resulting from water, streams of mud, dirt and road debris thrown up from the tires of the towing vehicle.

Protective electrical mounting boxes have recently been developed which are attachable to a rear trailer hitch mounted under a towing vehicle. The mounting box, besides being exposed to severe environmental conditions, such as splashing mud, dirt and road debris, is also subject to bumping and jostling as the vehicle is often driven on extremely rough roads. The box is configured to fit and mount to a specifically sized hitch in a secure fashion. As such, a well stocked supply of a variety of modified boxes have been needed to accommodate the many sizes of hitches.

What is desired is a single electrical mounting box that can mount onto a range of differently sized hitches and a variety of differently configured hitches. What is also needed is a mounting configuration that provides for a single mounting box to be able to mounted to a range of differently sized hitches and to a variety of hitch constructions.

SUMMARY OF THE INVENTION

In accordance with one aspect of the invention, a mounting box is provided for mounting an electrical connector to a trailer hitch. The hitch cross tube extends across the rear of the vehicle and has a substantially rectangular or square cross-section. The mounting box includes an enclosure for enclosing the body of the electrical connector therein. The box has a side with a seat therein that is shaped to matingly receive the cross tube to seat the box at a rotated canted angle with respect to the cross tube. The box when seated engages only two exterior walls of the cross tube about a common edge. In this fashion, rectangular cross tubes of different sizes can all be selectively seated onto the mounting box. A tie down device rigidly secures the mounting box to the cross tube at the rotated canted angle.

Preferably, the seat is formed by notches in respective opposing first and second end walls of the box that face an open side of the box. Upon installation, the open side of the box is disposed against the mated two exterior walls of the cross tube spanning the common edge. It is desired that the notch in the first end wall is symmetrical about a center plane of the mounting box with two angled edges meeting at a central vertex. The notch in the second end wall is also symmetrical about the center plane of the mounting box with two angled edges extending toward the center plane.

Preferably, the first end wall of the box has a first opening for receiving the body of the electrical connector and has its notch laterally spaced from the first opening. The enclosure includes a movable flap extending from the notch to the first opening and in communication with the first opening and the notch. The flap is movable to an open position to provide access to the interior of the box for the wires extending to the electrical connector. Preferably, the vertex of the notch in the first end wall is located on the movable flap. The second end wall of the box has a second opening directly connected to its notch for receiving a plurality of wires connected to the electrical connector.

In accordance with another aspect of the invention, a mounting box is provided for mounting an electrical connector to a trailer hitch having a cross tube that extends across the rear of vehicle. The cross tube has a substantially circular cross section. The mounting box includes an enclosure for enclosing the body of the electrical connector. The box has a side with an arcuate seat therein. The arcuate seat is shaped to matingly receive the cross tube with circular cross section to seat the box with respect to the cross tube. The seat is preferably formed by a semi-circular notch in respective end walls of the box facing an open side of the box. The open side of the box is to be disposed against the mated exterior circular in cross section wall of the cross tube.

In accordance with another aspect of the invention, a mounting box is provided for mounting an electrical connector to a variety of trailer hitches. The trailer hitch has a cross tube extending across the rear of vehicle. The mounting box may be secured to a range of differently sized square or rectangular cross-sectioned cross tubes or to a cross tube with a circular cross section. The mounting box includes an enclosure for enclosing the body of the electrical connector. The box has a seat being in the form of a notch in the front and rear walls of the box facing an open side of the box. The open side is to be disposed against the mated exterior walls of the cross tube. The notches selectively matingly receive a cross tube with a rectangular cross section to seat the box at a rotated canted angle with respect to the cross tube. The box engages only two exterior walls of the cross tube having a rectangular cross section. These two walls of the cross tube share a common edge.

The notches are located on trimmable wall sections of the respective first and second end walls of the box. The trimmable wall sections have respective arcuate edges joined to the remainder of the respective first and second end walls. Preferably the movable flap in communication with the first opening and the notch, includes a portion of the trimmable wall section. The trimmable wall sections can be trimmed to be removed from the remainder of the respective front and rear walls such that after being removed, the seat becomes arcuately shaped to matingly receive a cross tube with a circular cross section. In this fashion, the box is now seated with a cross tube with circular cross section.

In this fashion, the mounting box is adaptable to be mounted to a selected one of a variety of cross tubes ranging from rectangular cross sections of different sizes to having a circular cross section.

BRIEF DESCRIPTION OF THE DRAWINGS

Reference is now made to the accompanying drawings in which:

FIG. 1 is a perspective view of the mounting box mounting an electrical connector to a trailer hitch at the rear of a vehicle;

FIG. 2 is an enlarged perspective view of the mounting box on fragmented portion of a trailer hitch cross tube shown in FIG. 1;

FIG. 3 is a cross-section view taken along lines 3—3 shown in FIG. 2;

FIG. 4 is an exploded view of the mounting box and electrical connector to be mounted therein:

FIG. 11 is a perspective view of a modified mounting box on a fragmentary portion of a trailer hitch cross-tube having a circular cross section;

FIG. 12 is an enlarged perspective view of the mounting box shown in FIG. 11;

FIG. 19 is a cross sectional view taken along lines 19—19 shown in FIG. 16;

FIG. 20 is a bottom plan view of the mounting box shown in FIG. 16; and

FIG. 21 is a schematic side elevational view illustrating how the mounting box may be mounted onto a variety of differently sized hitch cross tubes with square or rectangular cross-sections.

DETAILED DESCRIPTION OF THE PREFERRED EMBODIMENTS

Figure 5:
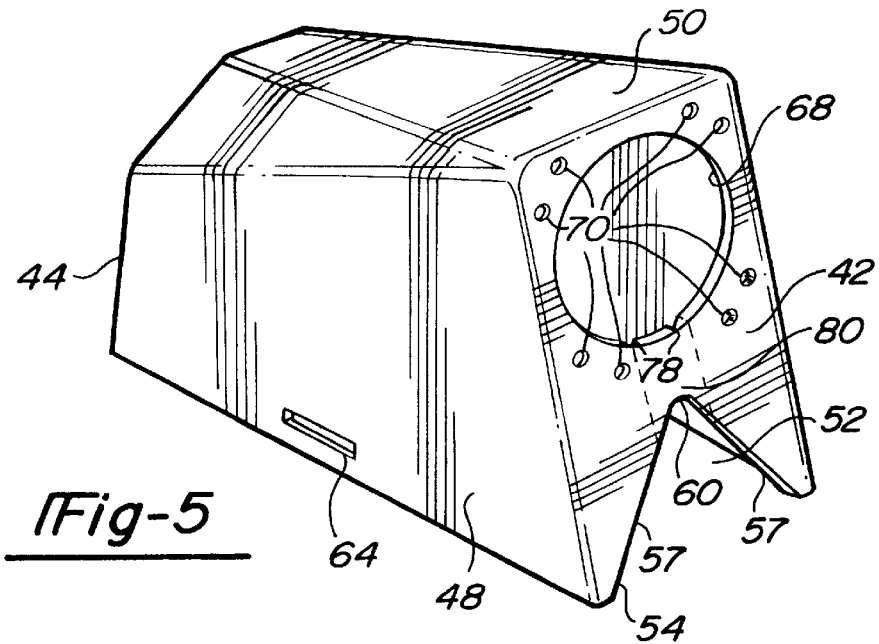
FIG. 5 is an enlarged perspective view of the mounting box shown in FIG. 2.
Figure 6:
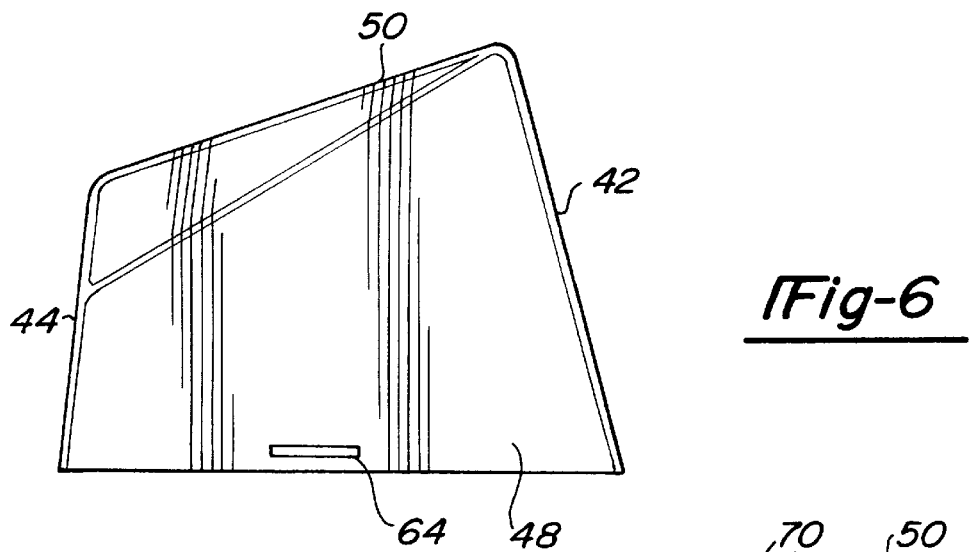
FIG. 6 is an enlarged side elevational view of the mounting box shown in FIG. 5.

Referring now to FIGS. 1–4, a mounting box 30 formed with a polymeric material mounts on a cross tube 32 of a conventional trailer hitch 34. The cross tube 32 extends laterally across and secured to the underside of a vehicle 35 at its rearward end. In the preferred embodiment, the mounting box 30 is injection molded with a high density polyethylene. The cross tube 32 typically is substantially rectangular or square in cross-sectional configuration with top, bottom and two side walls 36, 37, 38, and 39 respectively.

Walls 37 and 39 share common edge 33. The polymeric material will not rust or corrode.

The mounting box 30 encloses and mounts an electrical connector 40 to the cross tube 32. The mounting box 30 includes first and second end walls 42 and 44. Side walls 46 and 48 span between the walls 42 and 44. A cover wall 50 faces rearwardly from the vehicle 35. An open side 52 is formed that faces the cross tube 32. The end walls 42 and 44 each have notches 54 and 56 therein which are shaped to matingly engage two walls 39 and 37 of the cross tube 32 such that the open side 52 is closed. Each notch is substantially v-shaped. Notch 54 has respective straight edges 57 and notch 56 has straight edges 59. Notch 54 has a center apex 60 centrally located at a center plane of the box. Each pair of respective notch edges 57 and 59 are each deposed symmetrically about the central plane of the box. As shown clearly in FIG. 3 when the mounting box 30 is installed on the hitch 34 the cross tube 32 has only two sides 37 and 39 engaging the respective edges 57 and 59 and the common edge 33 of the cross tube is seated at the apex 60.

Opposing slots 62 and 64 are formed through the side walls 46 and 48 respectively in proximity to the open side 52 to receive a tension member 66 such as a conventional screw adjustable band clamp. The band clamp is inserted through the slots and is secured around and tightened about the cross tube 32 to secure the mounting box in its canted mounted position as shown to be approximately at a 45° angle between the horizontal and vertical as clearly shown in FIG. 3.

Figure 7:
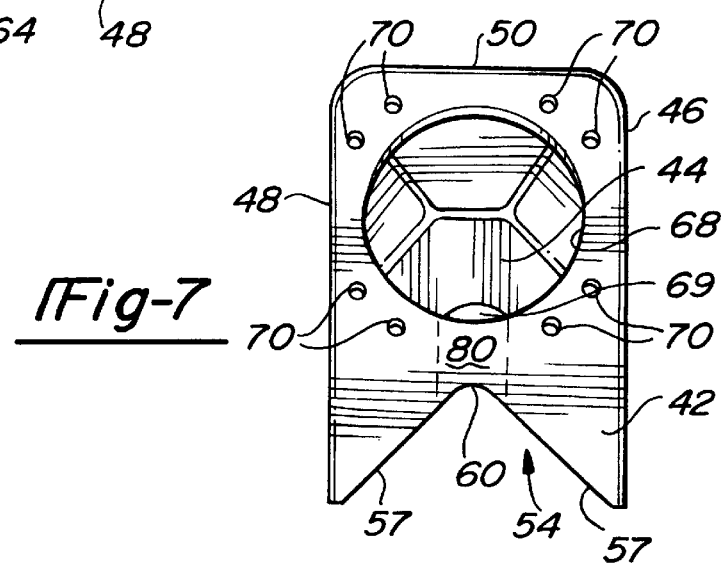
FIG. 7 is an enlarged front elevational view of the mounting box shown in FIG. 5.
Figure 8:
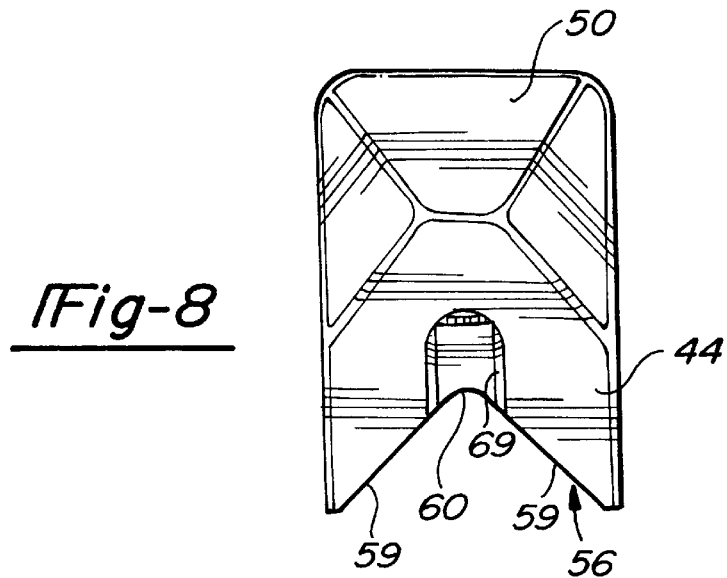
FIG. 8 is an enlarged rear elevational view of the mounting box shown in FIG. 5.

The box has a circular opening 68 in the end wall 42 to receive the electrical connector 40 and as shown in FIG. 8, a recessed cutout 69 is provided in end wall 44 to let a multi-wire cable 74 to pass therein that is connected to the electrical connector 40. As clearly illustrated in FIG. 5 and 7, a plurality of fastener holes 70 are provided in side wall 42 in a pattern that corresponds with a standard pattern of mounting holes 72 in a flange 73 of electrical connector 40. The pattern of holes 70 in end wall 42 permits the shown standard 7-way connector 40 to be mounted thereto via fasteners 76 in the shown orientation or other orientations rotated in 90 degree increments. The pattern of holes 70 also provides for mounting of a standard 6-way electrical connector (not shown) to be mounted on diagonally disposed holes 70.

Figure 9:
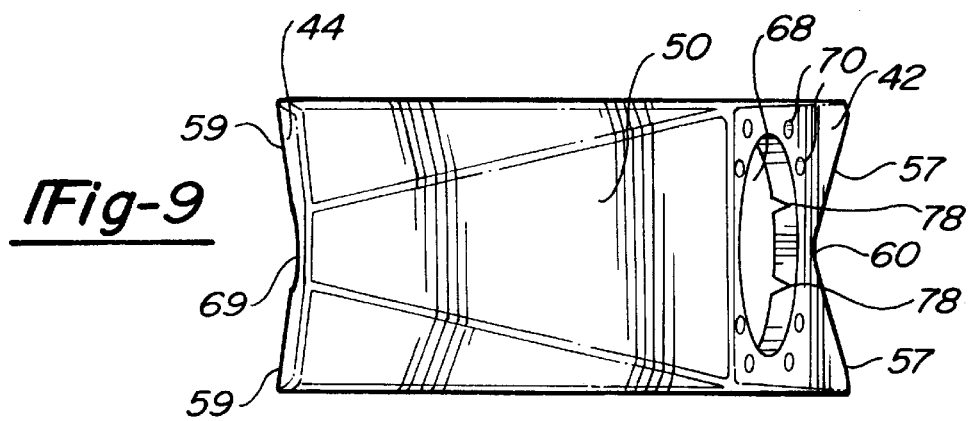
FIG. 9 is an enlarged top plan view of the mounting box shown in FIG. 5.
Figure 10:
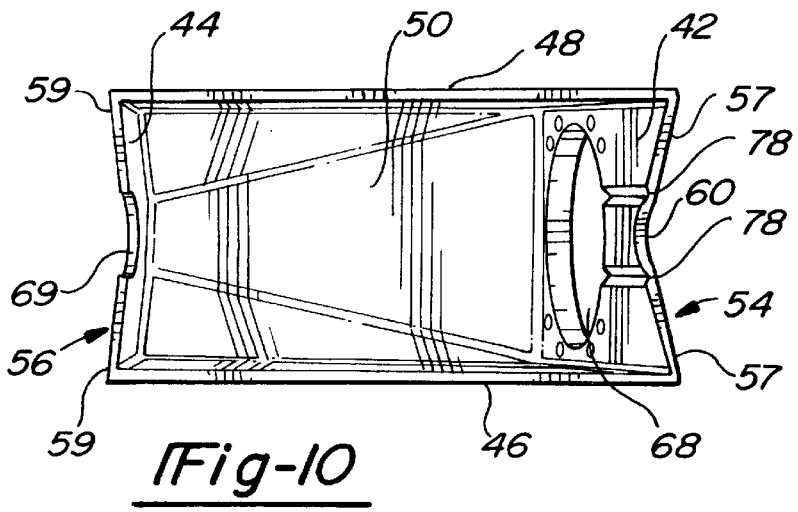
FIG. 10 is an enlarged bottom plan view of the mounting box shown in FIG. 5.
Figure 13:
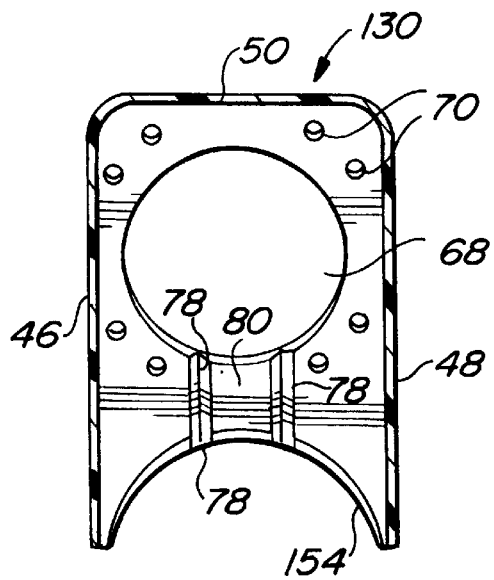
FIG. 13 is a cross sectional view taken along lines 13—13 shown in FIG. 12.
Figure 14:
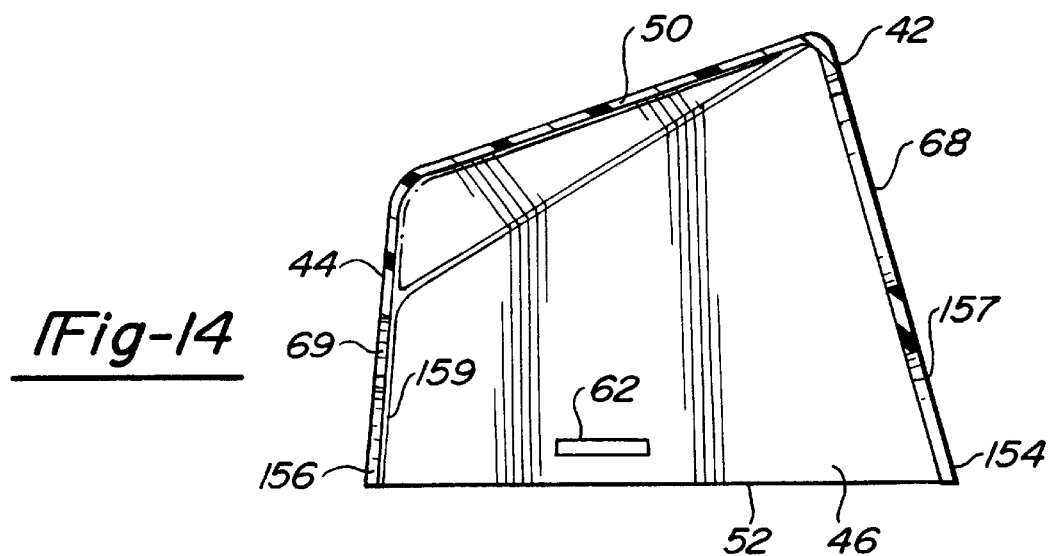
FIG. 14 is a cross sectional view taken along lines 14—14 shown in FIG. 12.
Figure 15:
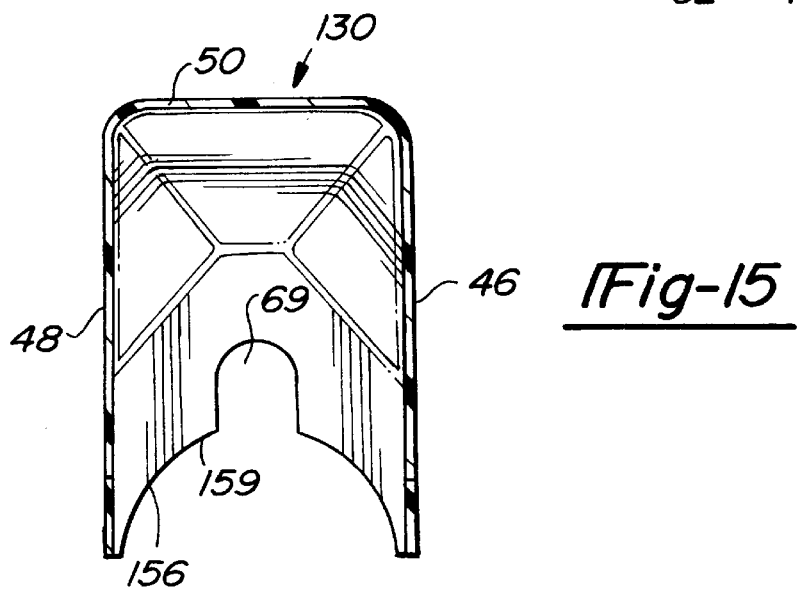
FIG. 15 is a cross sectional view taken along lines 15—15 shown in FIG. 12.
Figure 16:
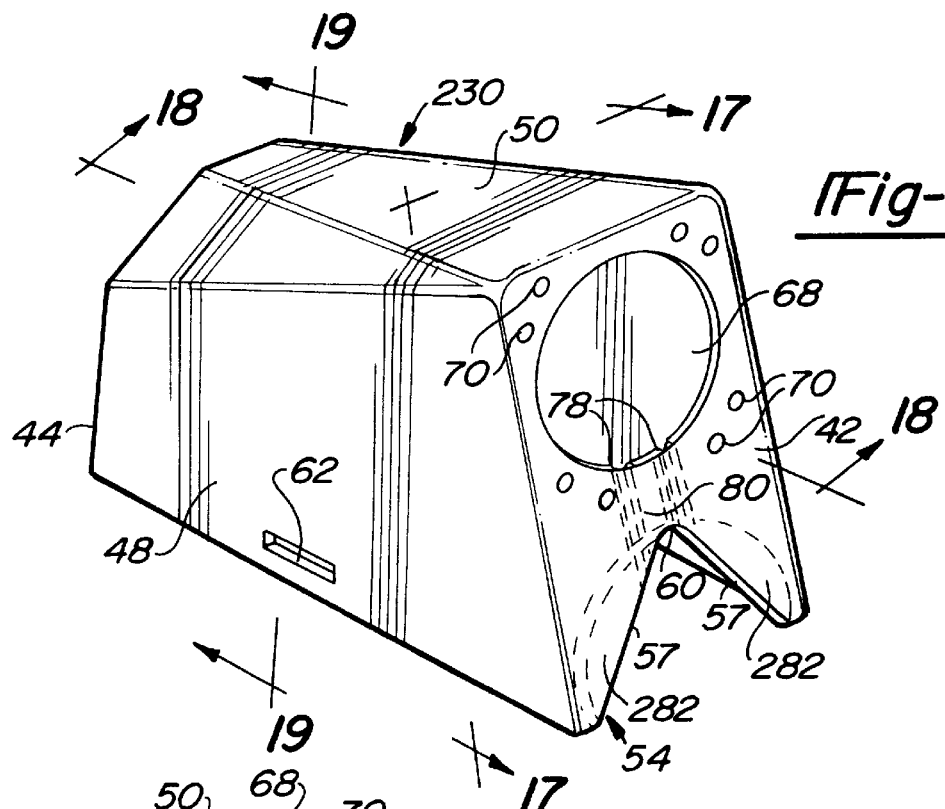
FIG. 16 is an enlarged perspective view of another embodiment of a mounting box.
Figure 17:
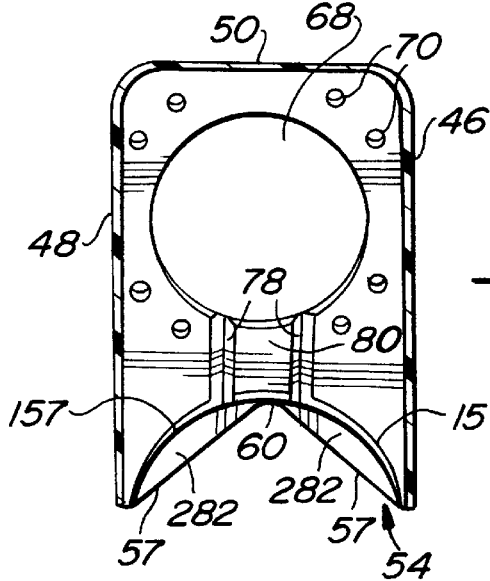
FIG. 17 is a cross sectional view taken along lines 17—17 shown in FIG. 16.
Figure 18:
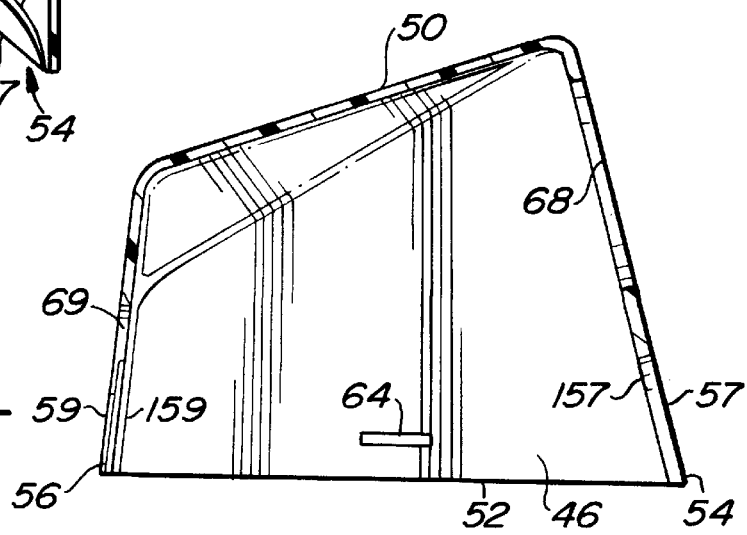
FIG. 18 is a cross sectional view taken along lines 18—18 shown in FIG. 16.

As shown in FIGS. 5, 9 and 10, the end wall 42 has parallel notches or score lines 78 formed in end wall 42 between notch 54 and opening 68 to enable a hinge flap 80 as shown in FIG. 4 to be formed therein to permit the electrical cable 74 to be laterally positioned into the opening 68. The hinge flap 80 is formed by cutting through one score line 78 and using the other score line 78 as a living hinge. In this way, the electrical cable 74 may be permanently pre-wired to the connector 40 before the connector 40 is installed into opening 68. The hinge flap 80 is closed after the pre-wired cable 74 is positioned within the interior of the box 30 and opening 68.

The box 30 when installed on the cross tube 32, encloses the body of 41 of the electrical connector 40 and thus protects the body from hostile elements, damage and wear that otherwise can result from streams of water, mud, dirt and road debris kicked up from underneath vehicle 35. The box is firmly and rigidly secured in a stationary position and resists the forces incident to the connection and disconnection of a mating trailer electrical connector (not shown) with the electrical connector 40 while providing a convenient and attractive location to connect and disconnect the trailer electrical connector to the connector 40. Furthermore, box 30 accommodates an electrical connector 40 that is pre-wired to the vehicle 35 without splicing, disconnection or other disruption to the wires in cable 74.

In addition, as shown in the schematic in FIG. 21, the connector box accommodates a variety of differently sized cross tubes 32. As shown by the schematic installation FIG. 21, the size of the cross tube 32 need not be limited to one size. A range of sizes, for example from commercially available 2 inches wide to 3½ inches wide, are illustrated to be equally adept for the box 30. The box by being installed at the corner of the cross tube and engages only two sides of the cross tube allows for a wide range of sizes and is not limited to one size cross tube.

Reference now is made to FIGS. 11–15 which illustrate an alternate embodiment of an electrical connector box 130 to be seated to a hitch 134 with a cross tube 132 of a circular cross section. The above described structural elements that are the same as the first embodiment will not be further described and have the same numerals. This box 130 has the same structure as the box 30 shown in FIG. 1–10 except that the notches 154 and 156 have their shape changed to a semi-circular shape. The semi-circular notches 154 and 156 each have the same radius formed by arcuate edges 157 and 159 to be seated on a cross tube 132 of circular cross section of a matching radius. The band clamp 66 is attached through the box 130 and about the cross tube to secure the box to the cross tube in the same fashion as the first described embodiment.

Reference now is made to FIGS. 16–20 which illustrate a third embodiment of an electrical connector box 230. This box has the similar structure to the other two embodiments and similar elements will have the same numerals. In box 230, the end wall 42 has the v-shaped notch 54 and end wall 44 has v-shaped notch 56. When in this condition, the box 230 works and functions in the same manner as box 30 and can be secured to a wide range of rectangular or square shaped cross tubes 32 as shown in FIG. 21.

In addition, the end walls 42 and 44 have thinned or trimmable sections 282 and 284 extending from the respective straight edges 57 and 59 to respective arcuate edges 157 and 159. It should be noted that the score lines 78 pass through the thinned section 282 such that hinge 80 is formed in-part by section 282. Furthermore, apex 60 of notch 54 is aligned with the arcuate edge 157. Trimmable sections 282 and 284 may be also formed by having an arcuate score or weakened lines coincident with the arcuate edges 157 and 159. In this way sections 282 and 284 may have the same thickness as the remainder of end walls 42 and 44.

Each section 282 and 284 may be trimmed off of the respective wall 42 and 44 such that the notch 154 and 156 have their shaped changed from the v-shape to an arcuate shape as in the second embodiment. In this way, the box 230 can be used for either square or rectangular cross tubes 32 as shown in FIGS. 2 and 21 or for a circular cross tube 132 as shown in FIG. 11.

Other variations and modifications are possible without departing from the scope and spirit of the present invention as defined by the appended claims.

The embodiments in which an exclusive property right is claimed is defined as follows:

1. A mounting box for mounting an electrical connector to a trailer hitch having a cross tube having a substantially rectangular cross-section which extends across the rear of vehicle; the mounting box comprising;
    an enclosure for enclosing the body of the electrical connector therein;
    said box having a side with a seat therein, said seat shaped to matingly receive said cross tube to seat said box at a rotated canted angle with respect to the cross tube; said box engagable with only two exterior walls of said cross tube about a common edge when said box is mounted on said cross tube;
    a tie down device for rigidly securing said mounting box to said cross tube at said rotated canted angle.

2. A mounting box as defined in claim 1 further comprising:
    said seat being a notch in a first and second opposing end wall of the box at each end of an open side of said box to be disposed against the mated exterior walls of the cross tube.

3. A mounting box as defined in claim 2 further comprising;
    said notch in one of said first end wall being symmetrical about a center plane of said mounting box with two angled edges meeting at a central vertex;
    said notch in said second end wall being symmetrical about a center plane of said mounting box with two angled edges extending toward said center plane.

4. A mounting box as defined in claim 3 further comprising:
    said first end wall of said box having a first opening for receiving the body of the electrical connector and having said notch laterally spaced from said first opening;
    said second end wall of said box having a second opening connected to said notch in said second end wall, said second opening for receiving a plurality of wires connected to said electrical connector.

5. mounting box as defined in claim 4 further comprising:
    said enclosure includes a movable flap in communication with said first opening and said notch, said flap movable to an open position to provide access to the interior of the box for the wires extending to the electrical connector.

6. A mounting box as defined in claim 5 further comprising:
    said vertex of said notch in said first end wall being in said movable flap.

7. A mounting box for mounting an electrical connector to a trailer hitch having a cross tube with a substantially circular cross section which extends across the rear of vehicle; the mounting box comprising;
    an enclosure for enclosing the body of the electrical connector therein;
    said box having a side with an arcuate seat therein, said arcuate seat shaped to matingly receive said cross tube with circular cross section to seat said box with respect to the cross tube;
    a tie down device for rigidly securing said mounting box to said cross tube.

8. A mounting box as defined in claim 7 further comprising:
    said seat being an arcuate notch in respective first and second end walls of the box facing an open side of said box to be disposed against the mated exterior circular cross sectioned wall of the cross tube.

9. A mounting box as defined in claim 8 further comprising:
    said first end wall of said box having a first opening for receiving the body of the electrical connector and having said notch laterally spaced from said first opening;

said second end wall of said box having a second opening connected to said notch in said second end wall, said second opening for receiving a plurality of wires connected to said electrical connector.

10. A mounting box for mounting an electrical connector to a variety of trailer hitches having a cross tube with differently sized rectangular cross-sections or a circular cross section, said cross tube extending across the rear of vehicle; the mounting box comprising;

an enclosure for enclosing the body of the electrical connector within said enclosure;

said box having a side with a seat being in the form of a notch in respective first and second end walls of the box facing an open side of said box to be disposed against the mated exterior walls of the cross tube;

said notches selectively matingly receiving a cross tube with a rectangular cross section to seat said box at a rotated canted angle with respect to the cross tube; said box engaging only two exterior walls of said cross tube about a common edge;

said notches being located on trimmable wall sections of said respective first and second end walls; said trimmable wall sections each having a respective arcuate edge with the remainder of the respective first and second end walls, said trimmable wall sections being trimmable from said remainder of the respective first and second end walls such that after being trimmed, said seat becomes arcuate shaped to matingly receive a cross tube with a circular cross section to seat said box with respect to the cross tube with circular cross section a tie down device for rigidly securing said mounting box to one of said selected cross tube with a rectangular cross section at said rotated canted angle and said cross tube with a circular cross section.

11. A mounting box as defined in claim 10 further comprising:

said notch in said first end wall being symmetrical about a center plane of said mounting box with two angled edges meeting at a central vertex form said seat;

said notch in said second end wall being symmetrical about a enter plane of said mounting box with two angled edges extending toward aid center plane.

12. A mounting box as defined in claim 11 further comprising:

said first end wall of said box having a first opening for receiving the body of the electrical connector and having said notch laterally spaced from said first opening;

said second end wall of said box having a second opening connected to said notch in said second end wall, said second opening for receiving a plurality of wires connected to said electrical connector.

13. A mounting box as defined in claim 12 further comprising:

said enclosure includes a movable flap in communication with said second opening, said trimmable section of said first end wall and said notch, said flap movable to an open position to provide access to the interior of the box for the wires extending to the electrical connector.

14. A mounting box as defined in claim 13 further comprising:

said vertex of said notch in said first end wall being in said movable flap and in said trimmable wall section.

* * * * *

UNITED STATES PATENT AND TRADEMARK OFFICE
CERTIFICATE OF CORRECTION

PATENT NO. : 6,076,691
DATED : June 20, 2000
INVENTOR(S) : Jacob S. Belinky, et. al.

It is certified that error appears in the above-identified patent and that said Letters Patent is hereby corrected as shown below:

Column 8, line 9, of Patent; after "a" delete "enter" and insert therein --center--.

Column 8, line 10, of Patent; after "toward" delete "aid" and insert therein --said--.

Column 1, line 44, of Patent; after "to" second occurrence insert --be--.

Column 5, line 12, of Patent; after "and" delete "engages" and insert therein

--engaging--.

Column 5, line 51 of Patent; after "the" delete "notch" and insert therein

--notches--.

Column 5, line 52, of Patent; after :their" delete "shaped" and insert therein

--shapes--.

Column 6, line 33, of Patent; after "5." insert --A--.

Column 8, line 7, of Patent; after "vertex" add "to".

Signed and Sealed this

Twenty-second Day of May, 2001

*Attest:*

NICHOLAS P. GODICI

*Attesting Officer*     *Acting Director of the United States Patent and Trademark Office*